United States Patent
Godal et al.

(10) Patent No.: US 7,097,822 B1
(45) Date of Patent: Aug. 29, 2006

(54) PROCESS FOR PRODUCING CARBONACEAOUS SOLID MATERIALS AND HYDROGEN-RICH GASES

(75) Inventors: Arne Godal, Fana (NO); Bjorn F. Magnussen, Hundhamram (NO)

(73) Assignee: Carbontech Holding AS, Fana (NO)

( * ) Notice: Subject to any disclaimer, the term of this patent is extended or adjusted under 35 U.S.C. 154(b) by 0 days.

(21) Appl. No.: 09/674,661

(22) PCT Filed: May 7, 1999

(86) PCT No.: PCT/GB99/01433

§ 371 (c)(1),
(2), (4) Date: Jul. 2, 2001

(87) PCT Pub. No.: WO99/58614

PCT Pub. Date: Nov. 18, 1999

(30) Foreign Application Priority Data

May 8, 1998 (GB) .................................. 9809974.0
Feb. 26, 1999 (GB) .................................. 9904578.3

(51) Int. Cl.
*C09C 1/50* (2006.01)

(52) U.S. Cl. ..................................................... 423/450

(58) Field of Classification Search ................ 423/450, 423/445 R, 449.1
See application file for complete search history.

(56) References Cited

U.S. PATENT DOCUMENTS

| 3,619,140 A | 11/1971 | Morgan .................... 423/449.1 |
| 5,527,518 A | 6/1996 | Lynum et al. ........... 423/449.1 |

FOREIGN PATENT DOCUMENTS

| DE | 21 11 556 | 9/1971 |
| EP | 0 209 800 | 1/1987 |
| EP | 0 360 399 | 3/1990 |
| GB | 963 526 | 7/1964 |
| GB | 1 242 391 | 8/1971 |

*Primary Examiner*—Stuart Hendrickson
(74) *Attorney, Agent, or Firm*—Sughrue Mion, PLLC

(57) ABSTRACT

The present invention relates to a method of producing solid carbonaceous $C_xH_y$, wherein the ratio of x:y is greater than 2.5:1, or a hydrogen-rich gas, wherein a hydrocarbon fuel is heated with limiting amounts of oxidizer to a temperature of at least about 1000° C. whereby to effect incomplete combustion and pyrolytic decomposition of said hydrocarbon fuel, the carbonaceous product produced by that method, a method of combusting the gas produced by that method and reactors for performing these methods.

14 Claims, 5 Drawing Sheets

PROCESS FOR PRODUCING CARBONACEAOUS SOLID MATERIALS AND HYDROGEN-RICH GASES

This application is a 371 of PCT/GB99/01433 filed May 8, 1999.

The present invention relates to methods for producing solid carbonaceous materials and hydrogen-rich gases, methods of combustion, reactors for the same and use of such reactors.

Natural gas and several of its derivatives are most commonly used for energy purposes, by conversion to heat and electricity. With few exceptions, this conversion is started with a combustion process, where the so-called heating value of the fuel gas is released by converting the hydrogen and the carbon in the fuel gas into water (vapour) and $CO_2$. The oxygen necessary to perform this reaction is derived from the atmosphere which consists of 21% oxygen and 79% nitrogen.

Natural gas normally contains more than 80% methane and thus combustion may be represented by the overall reaction equation:

$$CH_4 + 2O_2 \rightarrow CO_2 + 2H_2O$$

This combustion provides a heating value of 50000 kJ/kg of methane. The combustion of for example $CH_4$ includes as many as 400–500 elementary reactions. However, only a few of these lead to a significant energy release in terms of heat.

Viewed in a simplistic way, the carbon is converted during combustion as follows:

$$C \rightarrow CO \rightarrow CO_2$$

If oxidation is divided into two steps as indicated above, the heat related to the formation of CO is only moderate causing only a small temperature increase. However, a large temperature increase is associated with the formation of $CO_2$. Thus the main heat release in hydrocarbon flames is associated with the formation of $CO_2$ and $H_2O$.

When combustion of hydrocarbons take place a lot of intermediate species are formed, most of which are combusted before the products leave the flame so that in general the final products which result are in the form of $CO_2$ and $H_2O$.

In flames, soot may also be formed. The formation of soot takes place on the fuel rich side of the flame and results as a consequence of heating the fuel. Soot is a hydrocarbon with 1–3% by weight of hydrogen and is a polybenzenoid molecule. It has been suggested that it may have a structure similar to $C_{40}H_{16}$.

Soot formation from the gas phase includes a dehydrogenation process, similar to cracking and/or pyrolytic decomposition, which probably produces the product $C_2H_2$ before being built up into a larger molecule by virtue of several thousand steps. However, in macroscopic terms, the soot formation process may be viewed as a two step process, namely the formation of a nucleus and then particle formation. The soot particles look like small spheres that may be agglomerated into clusters like grapes. The individual spheres have a diameter in the order of 10–100 nanometres.

In normal combustion of a hydrocarbon fuel, the fuel is introduced into the combustion chambers or burner systems in the form of jets or fuel sprays, or in other cases as a mixture between this fuel and the oxidizer, which is usually oxygen from the air. Usually two types of flames may be formed depending on the types of burner systems which are employed.

Diffusion flames occur when the fuel and oxygen are mixed on both the macro and micro, but not molecular scale through diffusive processes. Since combustion only occurs when reactants are mixed on a molecular scale, this gives rise to laminar or turbulent flames. Thus, the so-called thermal reactions resulting from the high temperatures of the laminar and/or turbulent flames take place only in localized regions such as thin sheets, vortex structures or similar which lie at the interface between the fuel and the oxygen. Generally the so-called thermal reactions at these sites are very fast and the temperature in the reaction zone is very high.

Pre-mixed flames occur when the fuel and oxygen are pre-mixed on a molecular scale. Generally a propagating flame is formed which has associated with it a flame velocity which refers to the propagating velocity of the flame. Such flames may be fuel-rich or fuel-lean. Many combustion devices utilize lean pre-mixed combustion as the reaction temperature is low thus leading to a reduced formation of $NO_x$ (which is formed from $N_2$ in air) since reactions leading to $NO_x$ formation are generally slow and strongly temperature dependent. In both of the above types of flames the same chemical reactions occur, albeit at different sites, but the influence on the products of the different reactions may vary.

In an ordinary combustor or burner, only a small fraction of the carbon is converted into soot and the soot burns away before the product leaves the flame. In some cases such as in lean premixed flames no soot is formed. In fires with big diffusion flames, where very fuel-rich structures are heated, large amounts of soot are produced. Sometimes 10–20% of the carbon in the fuel forms as soot which is not burnt off.

However, a major disadvantage with this combustion is the production of $CO_2$ which is detrimental to the environment. Furthermore, the soot-like material which forms, which has potential uses in a number of industrial applications is lost.

U.S. Pat. No. 5,527,518 (Kvaerner Engineering AS) describes a method of pyrolytic decomposition of natural gas (or methane) which results in the production of a hydrogen-rich gas by the use of a plasma torch which heats the hydrocarbon fuel to about 1600° C. Instead of the production of $CO_2$, carbon black, which may contain some hydrogen, is produced. This reaction is performed in the absence of oxygen except in reactions to modify the properties of the carbon black which has already been produced.

It has now surprisingly been found however, that at moderate detriment to the heating value per kg of fuel gas, harmful emissions of $CO_2$ may be reduced by conversion of the carbon content of the fuel into a solid form of carbon which has useful industrial applications.

This is achieved by manipulation of the above mentioned reaction scheme by using a controlled amount of oxygen in the system and by using a combustion process, which may be separated into 2 separate stages, coupled with pyrolytic decomposition.

By controlling the amount of oxygen in the system, the equation may be rewritten as:

$$CH_4 + O_2 \rightarrow C + 2H_2O$$

In the above reaction, while hydrogen is converted to water, carbon is decomposed from the fuel and forms as a solid material similar to soot. As a consequence, very little or no $CO_2$ forms. Such processes are achievable and still retain more than 50% of the original heating value. However in most cases it is realistic to expect that some carbon will react to form $CO_2$ and some will produce solid carbon, depending on the operating conditions and the reactor vessel design. Thus for example, a practical, readily or easily achievable reaction may be written as:

$$CH_4 + 1.5O_2 \rightarrow 0.5C + 0.5CO_2 + 2H_2O$$

This reaction would provide a heating value of 40000 kJ/kg fuel gas, produce 50% less $CO_2$ and produce solid carbon at an amount of 0.375 kg/kg methane. Thus a significant reduction in $CO_2$ emissions may be achieved with only a 20% reduction in heating value.

In the above equations sufficient oxygen is used to allow all the hydrogen in the reaction to be converted to $H_2O$. If however the levels of oxidizer are even further limited, some of the hydrogen in the reaction will be converted to $H_2$. Thus for example using methane as the hydrocarbon fuel (comprising both the feedstock and flame fuel) and limiting the amount of oxidizer, the equation may for example be rewritten as:

$$CH_4 + 0.1O_2 \rightarrow C + 1.8H_2 + 0.2H_2O$$

Alternatively if hydrogen is used as the flame fuel the above equation may be rewritten as:

$$CH_4 + 0.2H_2 + 0.1O_2 \rightarrow C + 2H_2 + 0.2H_2O$$

In both of the above equations the reactions produce enough heat to facilitate heating of the feedstock and consequent decomposition. Thus an oxidizer, such as oxygen, in stochiometric amounts such as 0.2 or less relative to the amount of carbon in the system may be employed. This is equivalent to 5% or less of the total amount of oxidizer required for complete combustion.

During the course of the above described reaction, unlike known reactions, significant amounts of solid carbon and hydrogen-rich gas are produced. This is achieved through incomplete combustion of the feedstock by control of the amount of oxidizer, e.g. pure oxygen, which is introduced into the system thus preventing continued combustion such that these products may be collected. The hydrogen-rich gas may then be combusted immediately or after collection to provide an energy source.

Thus, viewed from one aspect, the present invention provides a method of producing solid carbonaceous $C_xH_y$, wherein x and y are the average number of carbon and hydrogen atoms respectively and the ratio of x:y is greater than 2.5:1, wherein a hydrocarbon fuel (comprising bulk feedstock fuel and flame fuel) is heated with oxygen at a C:O ratio greater than 1:3, preferably 1:2 (e.g. greater than or equal to 1:1, e.g. 1:0.4, particularly preferably 1:0.2) to a temperature of at least about 1000° C. whereby to effect incomplete combustion and pyrolytic decomposition of said hydrocarbon fuel. In this system, the flame fuel is combusted and the combustion products which are produced are used to heat the bulk feedstock fuel to a temperature of at least about 1000° C. to achieve pyrolytic decomposition.

As referred to herein, the C:O ratio refers to the stoichiometric ratio of carbon and oxygen atoms and a greater ratio refers to a ratio containing relatively more C.

Preferably the value of x in the x:y ratio exceeds 40, leading to $H_y$ of less than 1–3% by mass in $C_xH_y$.

As referred to herein, "hydrocarbon fuel" also referred to as "fuel source" or "fuel gas", refers to any commercially or readily available hydrocarbons which are gaseous, liquid or solid (such as natural coal) at a temperature of 20° C. and a pressure of 1 bar, preferably one or more gaseous hydrocarbons, and which are susceptible to pyrolytic decomposition and/or combustion. This includes the fuel (preferably a gas) used to create the flame (referred to herein as the "flame fuel" or "flame gas") which may be the same or different to the bulk feedstock fuel. Particularly preferred is natural gas which is composed mainly of methane. Other appropriate hydrocarbons, particularly for use as flame fuels, include hydrogen ($H_2$), acetylene ($C_2H_2$) and propane ($C_3H_8$).

If solid fuels are to be used, it will be appreciated that appropriate particulation to a powder form will be necessary before introduction into the reactor. Appropriate techniques for preparing such powders and for introduction into reactors are well known in coal driven power plants in which coal powder is blown into the reactor. In the present invention the gas carrier of such powders may conveniently be the exhaust gases produced by the method of the invention.

Conveniently, flame fuels are the preferred fuels described above or any other combustible fuels that can create high temperatures when combusted with air or oxygen. "Flame fuel", "hydrocarbon fuel" and "bulk feedstock fuel" as used herein refers to the hydrocarbon component in additional to any associated trace carrier gas, e.g. air, oxygen, nitrogen, $CO_2$ etc., where present. Trace amounts of oxygen which may be present with the hydrocarbon fuel, such as in air do not constitute the oxidizer required for performance of the invention. This oxidizer is supplied in a controlled and precise manner.

Thus, the present method allows the production of a solid carbonaceous product containing 20% or more, preferably 50% or more, for example at least 80% of the carbon introduced into the system, by subjecting the hydrocarbon fuel to thermal reactions with limited combustion achieved by the use of restricted amounts of an oxidizer. Combustion of the hydrocarbons of a portion of the hydrocarbon fuel (ie. that portion which is the flame gas, which may be the same as or different, and may be mixed with or separate to the remaining feedstock) produces hot combustion products which then serve to heat the remaining feedstock (to temperatures of at least 1000° C.) producing the reactions required for solid carbon/hydrogen-rich gas production.

Preferably the method is performed by pre-heating the feedstock fuel (fuel source) to between 600 and 800° C., for example approximately 600° C. and passing said fuel source into a reactor. By raising the temperature of the fuel source, the hydrocarbon reaches a temperature close to the temperature as which pyrolytic decomposition may occur, but is not heated to a temperature where it will actually begin to decompose in the fuel stream prior to entering the reactor.

Once in the reactor, said fuel source is rapidly heated to a temperature of between about 1000 and 2000° C. (when measured locally) for between 0.1 and 10 seconds by interspersing said fuel source with air- or oxygen-assisted hydrocarbon flames (produced by the hydrocarbons of the flame fuel, which may be the same or different to the fuel source) wherein the heat of the combustion products causes localized heating resulting in pyrolytic decomposition. Conveniently, the reactor is operated at a pressure of between 0.1 and 150 bars.

The atmosphere in the reactor is composed solely of the hydrocarbon fuel (including the flame fuel and fuel source), the oxidizer (with any carrier gas) and the combustion and/or decombustion and/or decomposition products (e.g. solid carbon and hydrogen-rich gases). No other compounds are included in the reactor.

In one of its simplest embodiments, the hydrocarbon fuel is introduced into the reactor where it is interspersed with oxygen and/or air in a controlled manner and ignited thus causing local combustion limited by the amount of oxygen which is introduced. The periphery of the flames which intersperse with the remainder of the hydrocarbon fuel contains the hot combustion products which achieve temperatures in excess of 1000° C. thereby causing pyrolytic decomposition of adjacent molecules of the hydrocarbon fuel. In this case the flame fuel and feedstock fuel, which may be the same or different, are portions of the same fuel (the hydrocarbon fuel) which are mixed together. Alternatively, the flame fuel and feedstock fuel, which may be the same or different, may be separate from one another and after ignition and combustion of the flame fuel the combustion products are mixed with the feedstock fuel to achieve temperatures in excess of 1000° C.

Due to the limited amount of oxygen which is employed as oxidizer, the oxidizer is used up during the combustion reaction. Thus, soot formed in the reaction does not burn due to the absence of an oxidizer.

However, when using the combustion products to heat the fuel source, oxygen may be produced by decomposition of fractions of the combustion products $H_2O$ and $CO_2$. To avoid this, heating should be performed as rapidly as possible as mentioned above to prevent burning of the soot. This stimulates nucleus formation resulting in soot formation.

As mentioned above, said hydrocarbon flame may be produced by a hydrocarbon which is the same or different to the hydrocarbon-containing feedstock, for example the hydrocarbon of the flame may be acetylene. The hydrocarbon/s of the hydrocarbon fuel may be selected to alter the yield of solid carbon. For example, an acetylene or hydrogen flame may be used in preference to a methane flame due to the higher temperatures which the former achieves which results in higher solid carbon production.

Combustion products which are of a sufficient temperature to heat the feedstock in the hydrocarbon fuel may be produced in different ways. For example, a burner system may be used which is associated with, optionally external to, the reactor. Combustion in the burner system may be achieved by reaction between a fuel (flame fuel) specially introduced into the burner and an oxidizer, for example oxygen from air to produce a flame. Oxygen may be separated from the nitrogen in air and the nitrogen itself may be used in conjunction with other products of the methods described herein in chemical processes.

Preferably, the burner or burner-like system utilizes pure or nearly pure oxygen (with a moderate admixture of nitrogen, preferably with a O:N stoichiometric ratio greater than 1:1). The burner fuel (equivalent to the flame fuel) which is used for combustion may be the fuel corresponding to the feedstock fuel, or a different fuel, or more preferably may be the hydrogen-rich gas produced from the reaction of the invention which is provided to the burner system via an outlet of the reactor. The burner fuel which is used must be able to achieve temperatures of 2000° C. or more. The use of the hydrogen-gas is preferred to avoid excessive production of $CO_2$. Furthermore, reaction of hydrogen with oxygen leads to very high temperatures.

Localized heating of the hydrocarbon-containing feedstock fuel using the hot combustion products of the burner may be achieved by mixing the combustion products with the feedstock fuel such that rapid and temporary heating (ie. 0.1 to 10 seconds) of the fuel occurs. The C:O ratio referred to herein refers to the stoichiometric ratio of all carbon and oxygen atoms involved in the reaction (ie. from the oxidizer, hydrocarbon fuel and carrier gases) and thus includes those involved in the reaction in the flame. In the case in which a burner system is used, the C:O ratio would hence also include all carbon and oxygen atoms involved in the reactions in the burner.

Flames which intersperse said hydrocarbon fuel or feedstock fuel may be achieved by the use of a turbulent flame. Such flames are effective due to their ability to cause localized heating of the feedstock fuel, thus generating the high temperatures at the flame/fuel interface required for solid carbon formation. The burner system is preferably designed in such a way that the momentum of the combustion products (e.g. created by using an oxygen-assisted flame) may be utilised to perform a rapid mixing with the feedstock fuel (fuel source). Similarly, the feedstock fuel may be brought into contact with the combustion products by utilising and enhancing the momentum of the feedstock fuel. To achieve this aim, the interior of the reactor for performance of the method of the invention may be designed to allow counter flow, co-flow, cross flow (such as in tangential reactors or axial reactors with radially introduced feedstock) or a combination thereof, of the feedstock fuel and the hot combustion products of the burner system. The properties of carbon black produced may be varied by appropriate choice of the reactor and the method of mixing of the combustion products and the feedstock fuel. Appropriate reactors are described in for example patent applications EP-A-360399 (Columbian Chemicals), GB-1242391 (Phil Black Limited) and U.S. Pat. No. 3,619,140 (Morgan and Jordan).

In a counter-flow version of the invention, the oxidizer, the flame fuel and/or the hot combustion products from the burner system may be introduced through nozzle-like inlet port at very high velocity (typically 20–200 m/s), in an opposite direction to the other components of the hydrocarbon fuel (ie. the feedstock fuel), thus allowing the oxygen or hot combustion products to penetrate into the feedstock fuel, creating very hot fine structures, such that the formation of the solid carbonaceous material takes place in a large part of the feedstock fuel volume. The outlet of the reactor should be arranged to optimize the interaction of the feedstock fuel with the hot structures.

Alternatively, the oxidizer, the flame fuel and/or the hot gases are introduced through nozzles which surround the outlet, thus the feedstock fuel necessarily encounters the hot flames.

In the above described cases, the feedstock fuel may itself be introduced into the reactor in such a way to form a vortex flow structure.

Both the co-flow and cross-flow versions of the invention utilize the same mechanisms for their production, namely creation of shear forces by the interactions between the high velocity of one or more of the oxidizer, combustion products, flame gas or other components of the hydrocarbon fuel, ie. the feedstock fuel to create inter-mixing of the heated structures in the feedstock fuel. To achieve this effect, the inlet ports may be designed in such a way to create cyclone-like flow in the reactor.

In all cases, the mixing is designed such that rapid mixing may be achieved. After mixing, the peak of high local temperature disappears such that the temperature of the product which leaves the reactor is homogenous and preferably has a temperature in the order of 1000° C.

Alternatively, the interior of the reactor may be designed in such a way that no burner is present, but the hydrocarbon fuel and oxidizer are mixed and ignited, such that part of the hydrocarbon fuel acts as the flame fuel such that thermal reactions between the hydrocarbon fuel and the oxygen takes place in a localized fashion leading to temperature peaks exceeding 2000° C. One way to achieve this is to create turbulent structures that will contain the thermal reactions. The oxygen thereby completely or nearly completely reacts to form $CO_2$ and $H_2O$. The amount of carbon in the fuel converted to $CO_2$ is small since the average heating of the hydrocarbon fuel is moderate and of the magnitude of 1000° C., while the reacting structures locally achieve a much higher temperature and the amount of oxidizer which is available is limited.

The above is preferably achieved by supplying the oxidizer to the reactor in the form of pure oxygen or nearly pure oxygen, but may also be achieved if the oxygen includes a moderate admixture of nitrogen.

Thus, viewed from a preferred aspect, the present invention provides a method of producing a solid carbonaceous product wherein a hydrocarbon fuel (comprising a bulk feedstock fuel and flame fuel) is heated with oxygen at a C:O ratio greater than 1:3, e.g. equal or greater than 1:2, said method comprising at least the steps of pre-heating the bulk feedstock fuel and passing said bulk feedstock fuel into a reactor in which said bulk feedstock fuel is rapidly heated to a temperature of between about 1000 and 2000° C. for between 0.1 and 10 seconds by interspersing said bulk feedstock fuel with air- or oxygen-assisted hydrocarbon flames utilizing said flame fuel, to obtain localized heating whereby to effect partial pyrolytic decomposition.

Preferably the bulk feedstock fuel and flame fuel are the same and are pre-heated together and this fuel is ignited to create the hydrocarbon flames.

The C:O ratio corresponds to the stoichiometric ratio of the total carbon and total oxygen admitted to the reactor (including those admitted to the burner which may be external to the reactor), wherein the latter may be in the form of $O_2$, $H_2O$, $CO_2$ etc. As mentioned above, the C:O ratio is preferably significantly greater than 1:2 and thereby the oxygen which leaves the reactor by the outlet is in the form of $H_2O$ and most of the hydrogen is in the form of $H_2$.

The solid carbonaceous product produced by this method may be collected continually or intermittently during its production or at the end of the reaction. In cases where combustion of the hydrogen-rich gases which have been produced is to be performed, if this combustion is performed in a separate stage, the carbon may be collected prior to its initiation. Separation of the solid carbon may be performed by a cyclone system or filter-like or scrubber system, after which the solid carbon is cooled. However, if the production of solid carbon, hydrogen-rich gases and the latter's combustion is all performed sequentially or simultaneously in the same reactor, then the carbon black may be collected during or after the reaction.

The solid carbon thus formed has particular industrial applications and forms a further aspect of the invention. For example, the carbon may be used as an admixture in solid materials to modify the physical properties of the materials, such as their strength, thermal response, flexibility or wear.

The physical properties of the carbonaceous material may be modified by altering the operational conditions of the reactor. For example, this may be achieved by adjusting the inlet feeds to the reactor and/or reactor pressure, or by modifying the interior structure of the reactor such that the time scales of the heated structures are changed. This may be achieved for example by increasing the momentum of the oxidizer, flame gas, fuel source and/or combustion products introduced into the reactor. This may be achieved by increasing the flow rate of one or more of the above components or by reducing the input port or nozzle area and maintaining the same flow rate.

The soot-like carbon may be formed into materials such as carbon fibres, tubes, whiskers, spheres, shells or to fill particles or used in the production of materials such as printer's ink, technical rubber, carbon-containing solid materials such as pipe-materials and electrodes or as an additive such as to increase the strength of other materials such as metal, concrete etc.

The above described method also produces hydrogen-rich gas which is a combustible fuel which may be used as an energy source.

The present invention additionally thus provides a method of producing a hydrogen-rich gas with a H:C ratio on atomic basis equal to or exceeding 20:1, (ie. equal or less than 20% of the carbon in the feedstock fuel is converted to $CO_2$, e.g. about 50:1) and a H:O ratio greater or equal to 5:1 (e.g. about 10:1), wherein a hydrocarbon fuel is heated with oxygen at a C:O ratio greater than 1:3, preferably 1:2, especially preferably greater than or equal to 1:0.2, to a temperature of at least about 1000° C. whereby to effect partial pyrolytic decomposition of said fuel.

As mentioned above, the H:C, H:O and C:O ratios referred to herein denote stoichiometric or atomic ratios.

In the above method, the $H_2O$ which is produced is gaseous at the temperatures involved and is thus considered to form part of the hydrogen-rich gas.

As mentioned in connection with the solid carbon, this may be harvested during and/or after the reaction which produces it.

The energy produced by combustion of the hydrogen-rich gases of the invention may be used for any conventional processes requiring energy. Thus for example, combustion of the hydrogen-rich gases may be linked to a gas turbine combustor, boiler, or other machinery by appropriate modification of the reactor pressure for connection with associated machinery. The reactor and the interior of the reactor are preferably designed and operated at pressures such that utilization of the hydrogen-rich gas in energy systems may be readily facilitated and not require compression of the gas before it is used.

Such systems may have as their main purpose the use of solid carbon produced according to the methods of the invention, for example systems in which the solid carbon is formed into pellets, blocks or as bulk material. Alternatively, the systems may be designed to form fullerences (pellets), diamonds or monodisperse spheres of uniform size. The gas may also be used as fuel in a furnace such as in steam raising furnaces, glass furnaces, metallurgical furnaces or similar. Advantageously, the above methods produce only small amounts of $CO_2$ and offer environmentally friendly alternatives to conventional processes.

The hydrogen-rich gas may also be used to provide the fuel for the flame used in the method of the invention. Alternatively, the heat of the gas exiting from the reactor may be employed, for example to pre-heat the fuel gas, thus allowing conservation of energy.

The invention thus further provides a method of combustion wherein the hydrogen-rich gas produced according to the invention is combusted. This combustion may be performed with an appropriate oxidizer (e.g. air or oxygen) on the hydrogen-rich gas to produce energy which may then be utilized or may form an integral part of a chemical, metallurgical or similar process. To reduce the production of undesirable combustion products, and hence to reduce harmful emissions to the atmosphere, oxygen-rich oxidizer (preferably pure or essentially pure oxygen) is preferred.

Optionally, the energy evolved in the first stage of the reaction, ie. pyrolytic decomposition and combustion in the flame, may be utilized for the energy-requiring processes contemplated above. It will be appreciated that under certain circumstances, all or a part of the energy evolved during the first or second stage of the reaction may be recycled for use in initiating or sustaining these reactions.

The hydrogen-rich gas may also be used in chemical processes other than combustion to produce hydrogen-containing chemicals. When the oxidizer used in the above reaction is in the form of oxygen which has been separated from nitrogen in air (as described above), the nitrogen thus produced may be used in processes with the hydrogen-rich gas produced above to produce nitrogen-hydrogen compounds such as $NH_3$ or other compounds including nitrogen and hydrogen and other elements. In this respect, it will be appreciated that in reactions described above, sufficient amounts of hydrogen-rich gas are produced to ensure that nitrogen which is separated from air to yield the oxygen which is used in the reaction will be fully utilized to produce $NH_3$ with some hydrogen-rich gas remaining.

Reactors appropriate for performance of the invention form a further aspect of the invention. Reactors of the invention comprise at least: one or more inlet ports to carry the hydrocarbon fuel (or components thereof) into the reactor cavity, through which the oxidizer may also be carried, and one or more outlet ports, optionally with a capture chamber, through which evolved gases of the reactions may leave the reactor. Reactors are required to sustain temperatures required for performance of the above methods, ie. greater than about 2000° C. and pressures of 0.1 to 150 bars and thus should be manufactured from heat resistant steel or similar and equipped with heat resistant internal cladding and insulation.

To allow ignition of the hydrocarbon fuel to produce flames which intersperse with the remaining hydrocarbon fuel (ie. the feedstock fuel), a source of ignition is provided which may be external to or within the reactor (or external to or within a chamber within the reactor).

In instances in which the flame (or its combustion products), flame fuel and/or the oxidizer is provided separately to the feedstock fuel, one or more further inlet ports may be provided, for example a burner system may be provided which produces a flame and allows combustion products to enter the reactor. In this way, combustion is completed prior to contact with the remaining feedstock.

Thus, viewed from a further aspect the present invention provides a reactor for performance of the methods of invention comprising at least: one or more inlet ports allowing entry of the hydrocarbon fuel into the reactor cavity, one or more outlet ports through which evolved gas may leave the reactor and a source of ignition whereby to effect partial combustion of hydrocarbons introduced into said reactor or associated burner.

Said burner may be external or internal to the reactor cavity or chamber. In both cases, combustion products enter said reactor chamber through one or more reactor inlet ports. In the case of an externally arranged burner, said burner is connected to said one or more inlet ports via one or more inlet tubes. Where a distinct reactor chamber is present in the reactor cavity, appropriate inlet/outlet tubes or ports are provided for communication across the space between the reactor walls and the reactor chamber.

As mentioned previously, appropriate mixing of the combustion products and the feedstock fuel may be achieved by introducing the flame or combustion products (if a burner is used), the flame gas, the oxidizer and/or the hydrocarbon fuel or feedstock fuel through nozzle-like inputs or ports at a velocity of 20–200 m/s into (preferably in an opposite direction) one or more of the afore-mentioned fuels or gases, for example in an opposite direction to the feedstock fuel. These nozzles represent inlet ports and may replace or supplement existing inlet ports. They may be arranged in various positions within the reactor, or arranged in appropriate patterns, for example around the reactor outlet. Thus, the use of multiple inlet ports for the entry of feedstock fuel, flames, combustion products, flame gas, and/or oxidizer, of a diameter suitable to allow interspersion with other elements of the reaction when operated at an appropriate flow rate, is preferred.

Preferred embodiments of the invention will now be described with reference to the Figures in which.

Figure 1:
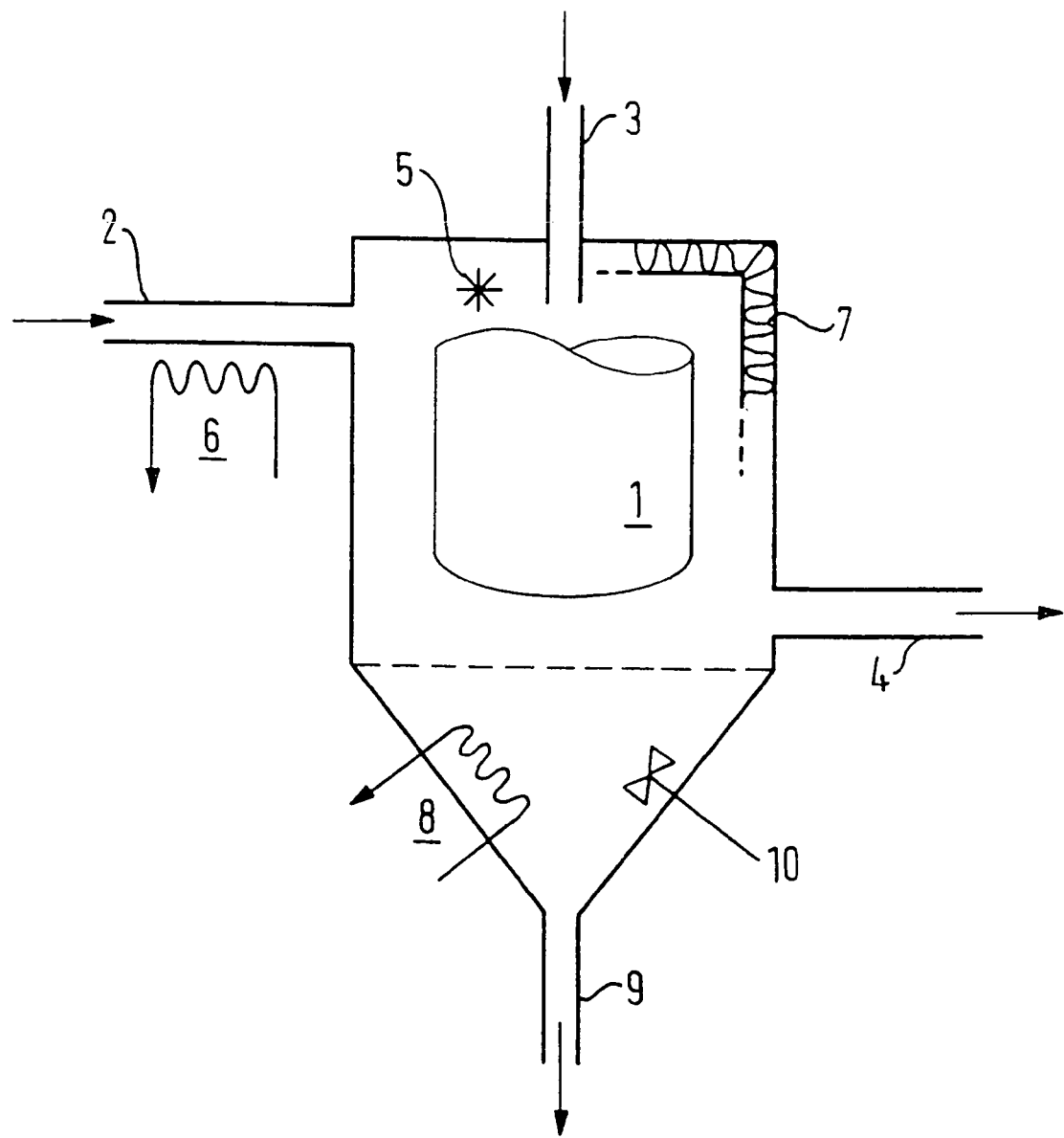
FIG. 1 shows a reactor for use according to the invention in which the oxidizer is admitted to the reactor through a separate inlet port.

FIG. 1 shows a reactor with an internal reactor chamber (1) within the reactor. The reactor additionally comprises a fuel inlet port (2), an oxidizer inlet port (3) and an outlet port (4). These inlet ports are appropriately connected to the reactor chamber (1) to allow entry of the media carried through the inlet/outlet ports, e.g by reactor chamber inlet ports (not shown) or by the use of a chamber which is not sealed, e.g. a cylinder-shaped chamber with unsealed ends. The reactor chamber may be associated with the reactor cavity inner walls or may be separate therefrom allowing the passage of gases/solid between the reactor cavity inner wall and the reactor chamber outer wall, e.g via inlet/outlet tubes or ports.

A source of ignition (5) is provided to ignite hydrocarbons in the reactor at an ignition zone and may be positioned exterior of or within the reactor chamber. A heat source (6) is arranged in sufficient proximity to the fuel inlet port (2) to allow heating of the hydrocarbon fuel. The reactor is insulated (7) and heat recovery may be achieved in an appropriate manner using an energy capture means (8), such as by heating $H_2O$ containing structures or other heat absorbing medium such as oil, liquid metal, gas, air or other appropriate substance. A further outlet port (9) may be provided, in this case exterior to the reactor chamber, for collection of the solid carbon material by use of a carbon removing device (10) such as a cyclone, filter, scrubber, scraper or electrical/mechanical precipitator.

In this embodiment, hydrocarbon fuel (containing the feedstock and flame fuel) is passed into the reactor through inlet port (2) after it has been pre-heated by the heating means (6). The pre-heating means may be provided by the outlet gas from the reactor. Oxidizer then enters the reactor and chamber via inlet port (3) and mixes with the hydrocarbon fuel to produce a combustible mixture. This is ignited by the ignition means (5) resulting in combustion to the extent that the presence of the oxidizer allows.

The hot combustion products are then interspersed as described previously by the action of shear generated turbulence at the interface between the hydrocarbon fuel and the high velocity oxidizer (e.g. oxygen). This allows hot combustion products or flames into the areas of the fuel gas which have not been combusted to produce thermal reactions at the interface of the combustion product and the unspent fuel leading to the production of solid carbon.

This carbon may be collected by the carbon removing device (10) and collected through the outlet port (9). Hydrogen-rich gas leaves the reactor through outlet port (4) and may be utilized for heating the hydrocarbon fuel or in a different energy requiring system. Energy produced (in the form of heat) in the reactor during the combustion and decomposition processes may be collected through appropriate energy capture means (8).

Figure 2:
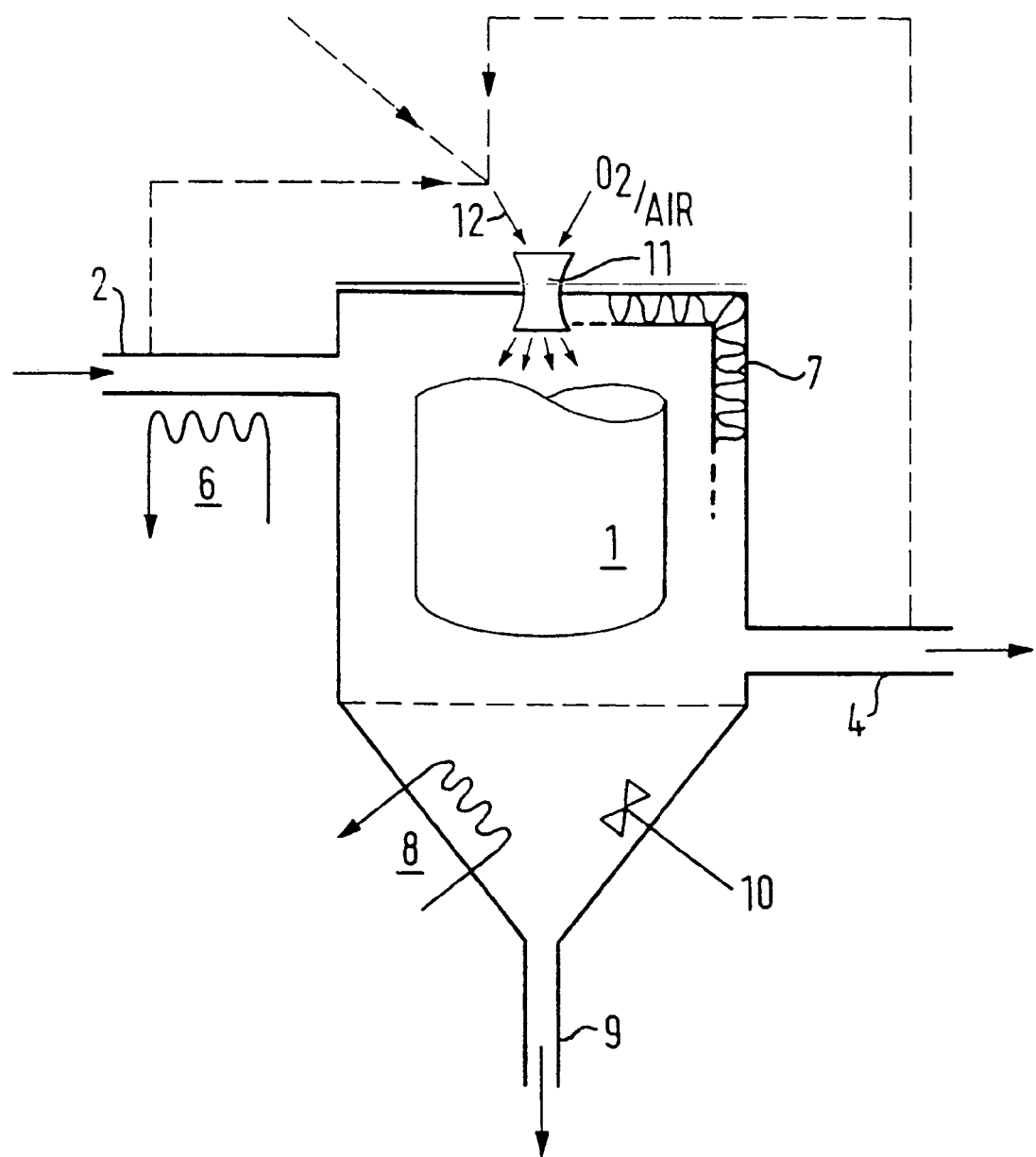
FIG. 2 shows a reactor for use according to the invention in which internal heating is provided by an integral burner system with separate flame fuel and oxidizer supplies in which the fuel may be the same as the feedstock fuel or provided by the hydrogen-rich gas which is produced or may be a separate fuel source.

In FIG. 2, the oxidizer inlet port (3) and source of ignition (5) of FIG. 1 is replaced with a burner (11) which is fed via an inlet port (12) which carries the oxidizer and flame gas to the burner for ignition. The burner includes an ignition means. The flame gas may be the same as the feedstock fuel, or may be the hydrogen-rich gas produced in the reactor or a separate fuel source. Similarly, in FIG. 3, the burner (11) may be placed external to the reactor, and be connected thereto by an inlet port (3) and the flame fuel and oxidizer provided into the burner via inlet port (12).

Figure 3:
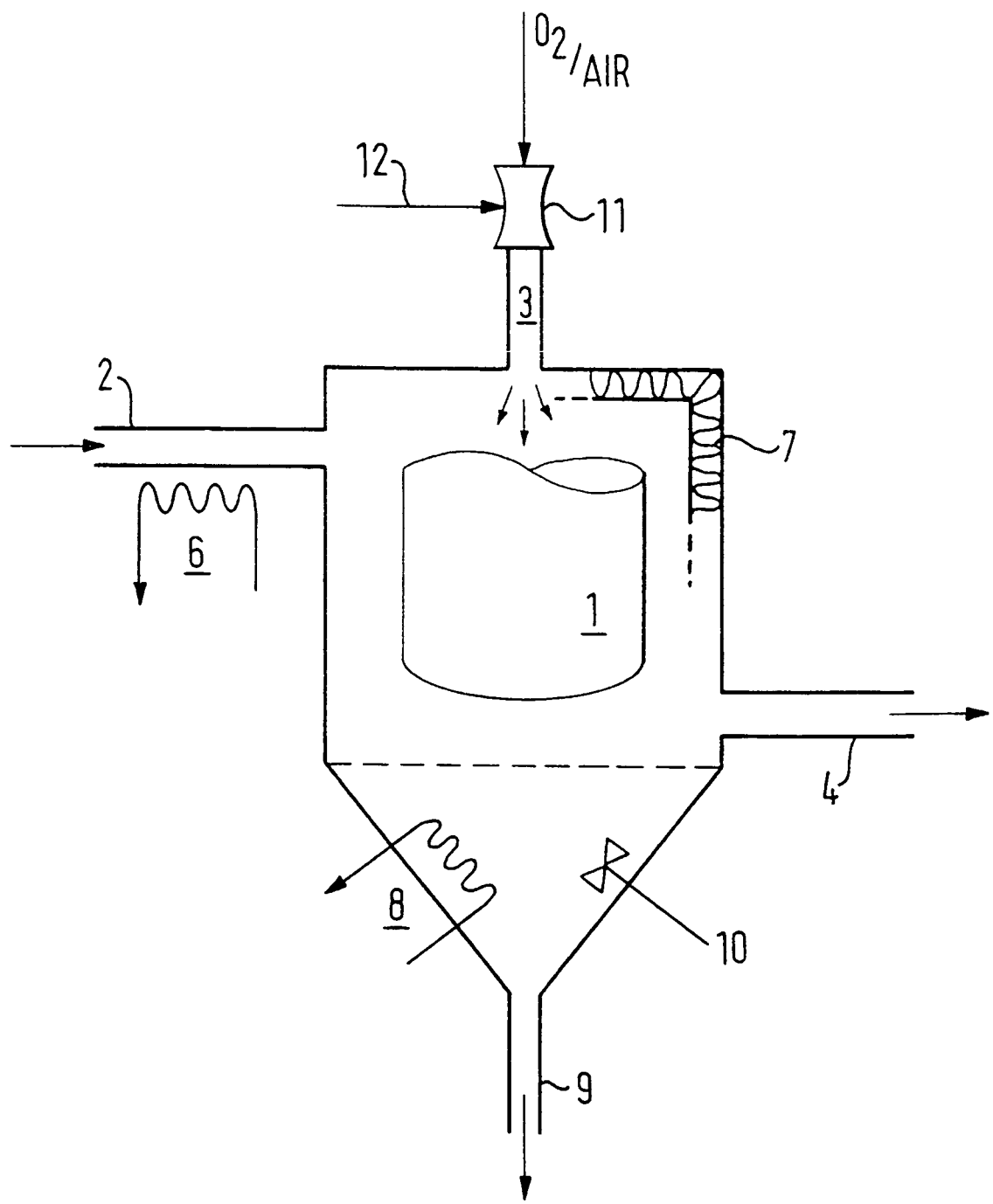
FIG. 3 shows a reactor similar to the reactor shown in FIG. 2 but with an external burner system.
Figure 4:
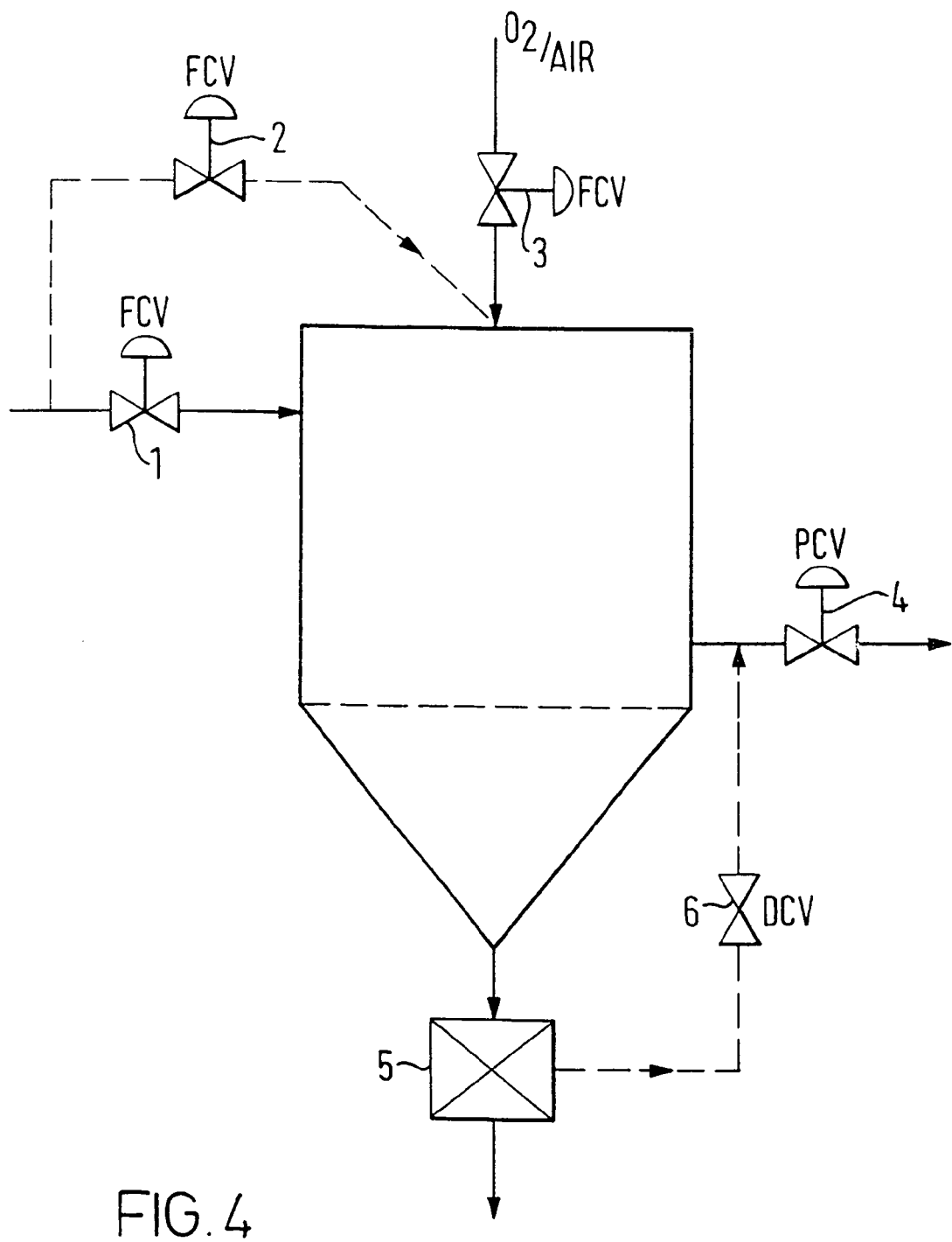
FIG. 4 shows a reactor fitted with a simple control system.

FIG. 4 shows a schematic representation of the reactors shown in FIGS. 1 to 3 in which various control valves are included. Thus, entry of the fuel may be controlled by flow control valve (1) into the reactor and by flow control valve (2) into a burner or point of ignition. Flow control valve (3) may be provided to control the flow of oxidizer into the reactor. Thus the reactor as described above may be made controllable in such a way that the composition of the products may be altered continuously and controlled according to operating procedures and product specifications. This advantageously allows variable emission control and the ability to achieve optimum power at such emission levels.

As will be appreciated from the discussion herein, the amount of oxidizer which is introduced into the reactor is crucial and thus this valve is of particularly importance for controlling the reaction. Pressure control valve (4) may be used to control the release of the gas which is produced in the reactor. Filter (5) onto which the solid carbon is collected may be linked to the outlet port carrying the hydrogen-rich gas and the flow of carrier gas from the filter may then be controlled by a control valve (6).

Figure 5:
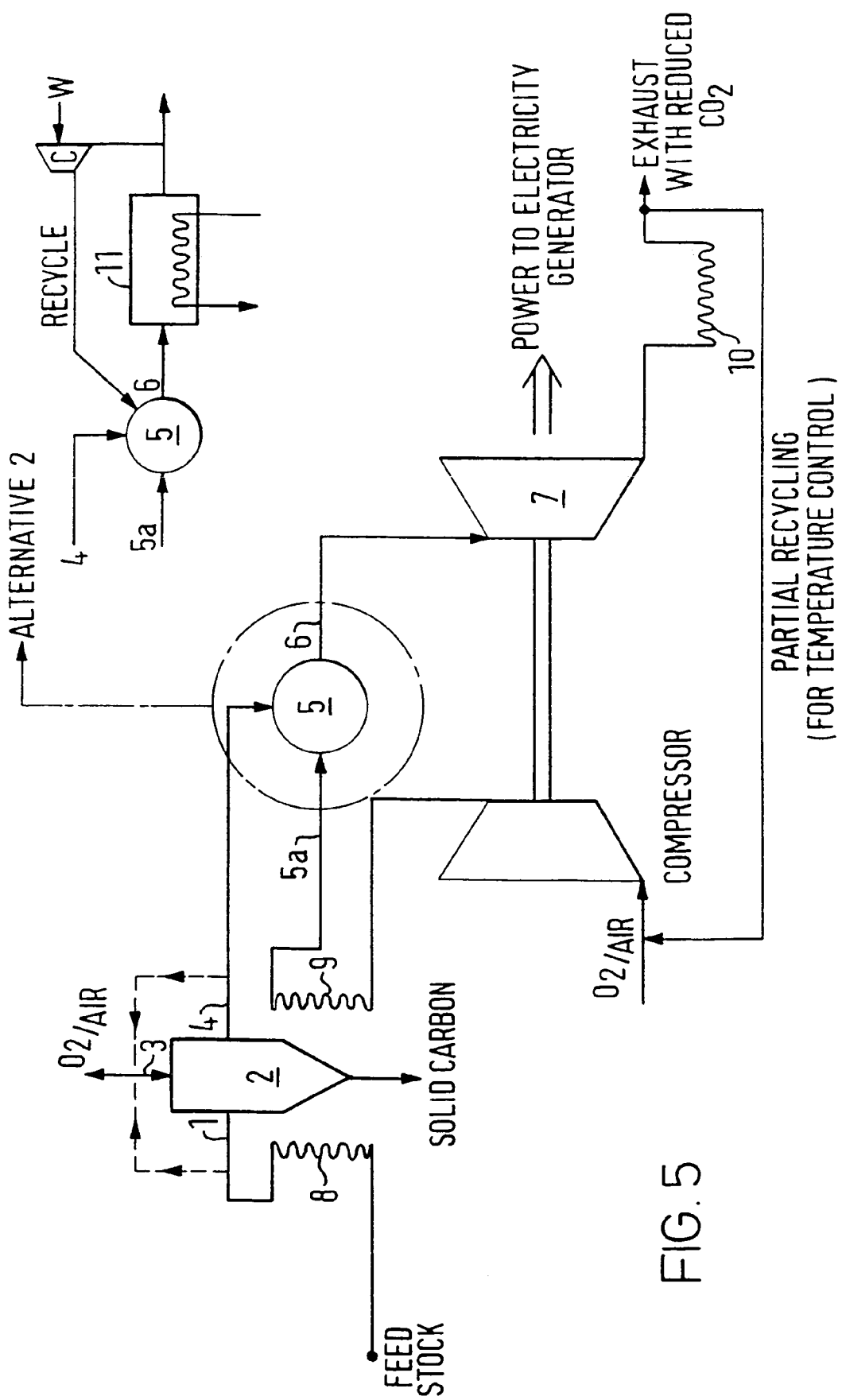
FIG. 5 shows how the reactors may be coupled to energy or gas turbine systems.

FIG. 5 shows how the energy produced in the 2-stage process of the invention may be used to power a gas turbine. In this case feedstock fuel is passed via port (1) into the reactor (2) and heated by the hot combustion products which enter the reactor at inlet port (3) produced by the combustion of a flame fuel and an oxidizer. The hydrogen-rich gas which exits at outlet port (4) is passed to a burner (5) where in the presence of air or oxygen, which is compressed and provided via burner inlet port (5a), it is combusted. The combustion products exit the burner via outlet port (6) and are used to power a turbine (7) which in turn is used to generate electricity.

To optimise the efficiency of this process, and thus to reduce environmental impact, side-products of the reaction may be utilized. Appropriate heat-exchange mechanisms may be employed, for example at (8) as shown in the previous Figures, at (9) to warm air to be passed into the burner and at (10) to capture the heat of exhaust gases. As indicated on FIG. 5, the heat of the exhaust gases may be used to heat the oxidizer to be used in the burner (5). Figure 5 also illustrates how energy produced in the 2-stage process may be used for boiler driven power plants (alternative 2). In that case, the combustion products which exit the burner via outlet port (6) are used to drive a boiler (11). Again appropriate heat exchange mechanisms may be used to improve efficiency.

Use of the above reactors for the production of the solid carbon or hydrogen-rich gas or for the production of energy form further aspects of the invention.

The invention claimed is:

1. A method of producing a carbon black product, comprising: heating a hydrocarbon fuel comprising bulk feedstock fuel and flame fuel in the presence of oxygen at a C:O stoichiometric ratio greater than 1:0.4, to a temperature of at least about 1000° C., to thereby effect incomplete combustion and partial pyrolytic decomposition of said hydrocarbon fuel, and so as to produce a carbon black product, wherein said carbon black product has a C:H stoichiometric ratio of greater than 2.5:1.

2. The method of claim 1, wherein the hydrogen content of said carbon black product is less than 3% by mass.

3. The method of claim 1, wherein said method comprises: pre-heating said bulk feedstock fuel, and passing said bulk feedstock fuel into a reactor, wherein said bulk feedstock fuel is heated to a temperature of between about 1000 and 2000° C. for between 0.1 and 10 seconds by interspersing said bulk feedstock fuel with hydrocarbon flames generated by reaction of said flame fuel with oxygen or air, to obtain localized heating and thereby effect partial pyrolytic decomposition.

4. The method of claim 3, wherein said hydrocarbon flames are generated by reaction of the flame fuel with oxygen.

5. The method of claim 1, wherein said bulk feedstock fuel and said flame fuel are the same or different, and wherein said temperature of at least about 1000° C. is achieved by combustion of the flame fuel which is mixed with, or separate to, the bulk feedstock fuel.

6. The method of claim 5, wherein said bulk feedstock fuel and said flame fuel are the same or different and are mixed together, and wherein said temperature of at least about 1000° C. is achieved by ignition of the hydrocarbon fuel causing localized combustion of said flame fuel within said bulk feedstock fuel.

7. The method of claim 1, wherein the combustion products are interspersed with said feedstock fuel by the use of turbulence.

8. The method of claim 7, wherein said turbulence is achieved by introducing one or more of a flame, combustion products, flame gas, oxidizer, hydrocarbon fuel or feedstock fuel into a reactor at a velocity of 20–200 m/s.

9. The method of claim 1, wherein said feedstock fuel comprises one or more gaseous hydrocarbons.

10. The method of claim 1, wherein said feedstock fuel is natural gas.

11. The method of claim 1, wherein a hydrogen-rich gas with a H:C stoichiometric ratio equal to or exceeding 20:1, and a H:O stoichiometric ratio greater or equal to 5:1 is produced.

12. The method of claim 11 further comprising the step of combusting the hydrogen-rich gas.

13. The method of claim 11, wherein said hydrocarbon fuel is heated in the presence of oxygen at a C:O stoichiometric ratio greater than or equal to 1:0.2.

14. The method of claim 1, wherein said hydrocarbon fuel is heated in the presence of oxygen at a C:O stoichiometric ratio greater than or equal to 1:0.2.

* * * * *